US011000853B2

(12) United States Patent
Li et al.

(10) Patent No.: US 11,000,853 B2
(45) Date of Patent: May 11, 2021

(54) PRISM ARRAY BASED PORTABLE MICROPLATE READER

(71) Applicants: Washington State University, Pullman, WA (US); Lei Li, Pullman, WA (US); Li-Ju Wang, Pullman, WA (US); Rongrong Sun, Shrewsbury, MA (US); Yu-Chung Chang, Pullman, WA (US)

(72) Inventors: Lei Li, Pullman, WA (US); Li-Ju Wang, Pullman, WA (US); Rongrong Sun, Shrewsbury, MA (US); Yu-Chung Chang, Pullman, WA (US)

(73) Assignee: Washington State University, Pullman, WA (US)

( * ) Notice: Subject to any disclaimer, the term of this patent is extended or adjusted under 35 U.S.C. 154(b) by 48 days.

(21) Appl. No.: 16/086,364

(22) PCT Filed: Mar. 22, 2017

(86) PCT No.: PCT/US2017/023618
§ 371 (c)(1),
(2) Date: Sep. 19, 2018

(87) PCT Pub. No.: WO2017/165540
PCT Pub. Date: Sep. 28, 2017

(65) Prior Publication Data
US 2019/0091695 A1    Mar. 28, 2019

Related U.S. Application Data

(60) Provisional application No. 62/311,845, filed on Mar. 22, 2016.

(51) Int. Cl.
*B01L 9/00* (2006.01)
*G01N 21/25* (2006.01)
(Continued)

(52) U.S. Cl.
CPC ............ *B01L 9/523* (2013.01); *G01N 15/06* (2013.01); *G01N 21/253* (2013.01);
(Continued)

(58) Field of Classification Search
CPC ............ G01N 21/6452; G01N 15/06; G01N 2015/0065; G01N 2015/0687;
(Continued)

(56) References Cited

U.S. PATENT DOCUMENTS

2005/0110989 A1    5/2005   Schermer et al.
2007/0054392 A1    3/2007   Guedon et al.
(Continued)

FOREIGN PATENT DOCUMENTS

WO   WO-2013093454 A1 *   6/2013   ............. G01N 21/25

OTHER PUBLICATIONS

Baird, Christopher, "Why can't flat lenses focus light", Sep. 30, 2013, Science Questions with Surprising Questions, 6 pages. (Year: 2013).*

*Primary Examiner* — Hina F Ayub
*Assistant Examiner* — Amanda Merlino
(74) *Attorney, Agent, or Firm* — W&C IP

(57) ABSTRACT

The methods and configurations herein provide for analysis of microplate based assays. Certain aspects include: an optical illumination panel; a plurality of sample wells configured to receive light from the optical illumination panel, and wherein the plurality of sample wells is configured with a first field of view; at least one aperture array configured to isolate directed light therethrough the plurality of sample wells; at least one optical array configured to receive optical information from the plurality of sample platforms, wherein the at least optical array comprises an array of individual microprisms configured with equal apex angles at distal equidistances along a row, wherein the individual micro-
(Continued)

prism apex angles decrease toward the center of the row culminating in at least one flat surface along a center portion of the row; and a detector configured to capture the optical information with a second field of view as provided by the at least one optical array.

8 Claims, 13 Drawing Sheets

(51) Int. Cl.
*G01N 21/64* (2006.01)
*G01N 35/00* (2006.01)
*G01N 15/06* (2006.01)
*G01N 15/00* (2006.01)

(52) U.S. Cl.
CPC ... *G01N 21/6452* (2013.01); *G01N 35/00722* (2013.01); *B01L 2300/0654* (2013.01); *B01L 2300/0829* (2013.01); *G01N 2015/0065* (2013.01); *G01N 2015/0687* (2013.01); *G01N 2015/0693* (2013.01); *G01N 2035/00891* (2013.01)

(58) Field of Classification Search
CPC . G01N 2015/0693; G01N 2035/00891; G01N 21/253; G01N 35/00722; B01L 9/523; B01L 2300/0654; B01L 2300/0829
See application file for complete search history.

(56) References Cited

U.S. PATENT DOCUMENTS

| | | |
|---|---|---|
| 2007/0151558 A1 | 7/2007 | Duston et al. |
| 2013/0004967 A1* | 1/2013 | Halverson ............. B29C 59/046 435/7.8 |
| 2015/0064699 A1* | 3/2015 | Wietzorrek ........ G01N 21/6452 435/6.11 |
| 2016/0076731 A1* | 3/2016 | Monch ................... F21V 5/004 362/97.1 |

* cited by examiner

PRISM ARRAY BASED PORTABLE MICROPLATE READER

CROSS-REFERENCE TO RELATED APPLICATION(S)

The present application claims under 35 U.S.C. § 119, the priority benefit of U.S. Provisional Application No. 62/311,845, entitled, "A Prism Array Based Portable Microplate Reader," filed Mar. 22, 2016. The disclosure of the foregoing application is incorporated herein by reference in its entirety.

STATEMENT OF GOVERNMENT INTEREST

This invention was made with government support under grant no. CMMI1538439 awarded by the National Science Foundation. The government has certain rights in the invention.

BACKGROUND OF THE INVENTION

Field of the Invention

The present invention relates to devices and methods for implementing a mobile prism array based microplate reader that incorporates a mobile computing device, such as a smartphone, and associated image acquisition and analysis functionality.

Discussion of the Related Art

Microplate (or microtiter plate) based assay is the standard and most commonly used tool today in the areas of biology, medicine, chemistry, agriculture, food, environment, and etc. Microplate can be used for a wide range of "wet-lab" type analysis and diagnosis, such as enzyme-linked immunosorbent assay (ELISA), fluorescence assay, fluorescence resonance energy transfer (FRET) assay, bioluminescence assay, chemiluminescence assay, tissue and cell analysis, and etc. By year 2009, the microplate related market was around $1.4 billion globally [1] (including the market for microplates, microplate liquid handling, and microplate readers, but not including the reagents used for assays).

Traditionally, microplate based assay needs a reading equipment (i.e. a microplate reader) to read and analyze the optical signal from a microplate. The reading equipment has the disadvantages of being expensive, large in size, and only used in a laboratory environment. It is impossible to apply the microplate based assay in situations such as in-field and in-situ diagnosis outside laboratories, medical diagnosis in less-developed or low-resource areas, and household applications.

For example, in remote areas (outside laboratories, underdeveloped or low-resource areas), owing to a lack of reading equipment and turnaround time, including back-and-forth, waiting, ready queue, and testing time, it can take several working days for immunoassays to diagnose diseases. In these areas, samples must be collected and sent back to central laboratories or taken to a well-equipped hospital. These inefficient and inconvenient routine procedures are laborious and time-consuming and have a high cost.

Most importantly, these delays can cause a failure to make prompt decisions and treatments in infectious diseases. To meet the needs of decentralized laboratory testing, a combination of mobile health (M-Health) and a point-of-care technology (POCT), called mobile point of care technology (MPOCT), is booming. MPOCT provides patients accurate diagnosis/testing immediately on-site and provides clinicians with rapid testing and transmittance of results to enhance clinical decisions in situ. M-health has been defined by the Global Observatory for e-health of the World Health Organization (WHO) as "medical and public health practice supported by mobile devices, such as mobile phones, patient monitoring devices, personal digital assistants and other wireless devices."

Breaking the limitations of locations, resources, and conventional testing turnaround times, MPOCT is changing the current treatment paradigm and the diagnostic procedures by immunoassaying virus, pathogen, biomarkers, toxicity/pollution, etc. There are several types of MPOC devices in recent years, such as smartphone paper test strip readers, smartphone colorimetric readers, smartphone optical spectrum readers, smartphone surface plasmon resonance detectors, smartphone ultrasound devices, smartphone microscopes, etc. However, most MPOC devices could only measure one sample each time. For high-throughput assays, microplate-based methods are the most commonly used. However, because traditional benchtop microplate readers scan and illuminate wells one-by-one and take optical measurement in each well, a sophisticated and thus an often, expensive optical design is warranted.

Background information on systems and methods that utilize optical techniques to include truncated prisms to diagnose microplate arrays can be found in U.S. Publication Application US2005/0110989, entitled, "OPTICAL DEVICE INTEGRATED WITH WELL," to Schermer et al., filed Nov. 12, 2004, including the following: "Methods and systems are disclosed that include an optical device for providing information about one or more samples. The system includes well(s) for holding the sample(s), and in one embodiment, the optical device(s) have non-parallel sidewalls optically contacting the well(s) for providing the information about the sample(s) in the well(s). In some embodiments the optical devices may be truncated prism(s). In some embodiments the optical devices are part of a unibody structure with the well(s)."

Background information on a mobile phone based colorimetric or fluorometric systems and methods can be found in Application Publication WO2013093454 A1, entitled, "ANAYLSIS OF COLORIMETRIC OR FLUOROMETRIC ASSAYS," to Farid Kahn, filed Dec. 19, 2012, including the following: "The present invention provides for the analysis of colorimetric or fluorometric assays by way of capturing an image of the assay on the camera (32) built into the mobile phone (30). A disposable tool (20) is provided to enable the assay to be positioned an appropriate distance from the phone camera (30). A software application on the phone (30) can then analyse the captured image to determinate a qualitative or quantitative outcome of the assay. In many examples, the test will require no modification of the phone hardware and is thus a convenient and cheap technique for analysing an assay. In other embodiments, other disposable items such filter(s) (41, 42) and/or additional light source(s) (LED 22) may be provided."

Background information on a mobile microscopy system can be found in U.S. Publication Application US2014/0267670, entitled, "MOBILE MICROSCOPY DEVICE AND METHOD THEREFOR," to Tipgunlakant et al., filed Mar. 13, 2014, including the following: "A mobile microscopy apparatus usable in connection with a mobile computing device comprising a memory unit and camera, the mobile microscopy apparatus comprising: an illumination module for illuminating a removable media with an illuminating light, an image acquisition optics for creating an image of the sample for acquisition by the camera of the mobile computing device, and a mounting frame assembly for detachably mounting the illumination module and the image acquisition optics to the mobile computing device and for holding the removable media in a predetermined position. In various implementations, the illumination module may provide either backside or frontside illumination of the removable media using the light generated by a light source of the mobile computing device. The mobile microscopy apparatus may operate in the microscope configuration, visible colorimetric microarray configuration, and/or fluorescent."

Thus, a need exists for a low-cost, portable, user-friendly, high quality diagnostic point-of-care (POC) system and methodology for everyone no matter whether the subject is living in a big city or in less-resource rural areas, or no matter whether the subject is in a developed country or in a less-developed country. Such a diagnostic/detection system and methodology is desirable to be of low cost, highly accurate, portable, and user-friendly. The embodiments herein are directed to such a need.

SUMMARY OF THE INVENTION

A particular aspect of the embodiments herein is directed to a diagnostic apparatus that includes: an optical illumination panel; a plurality of sample wells configured to receive light from the optical illumination panel, and wherein the plurality of sample wells is configured with a first field of view; at least one aperture array configured to isolate directed light therethrough the plurality of sample wells; at least one optical array configured to receive optical information from the plurality of sample platforms, wherein the at least optical array comprises an array of individual microprisms configured with equal apex angles at distal equidistances along a row, wherein the individual microprism apex angles decrease toward the center of the row culminating in at least one flat surface along a center portion of the row; and a detector configured to capture the optical information with a second field of view as provided by the at least one optical array.

Accordingly, the configurations and methodologies herein provide for ease of analysis of assay microplate arrays using as part of the design, a prism array to tilt the light from a microplate and thus make the optical signal readable by using a detector, such as, but not limited to, a camera on a mobile phone or a consumer digital camera. Such a unique reader can be used, for example, to provide colorimetric analysis of the emission and absorption of assays, enzyme-linked immunosorbent assay (ELISA) analysis, fluorescent analysis, and optical spectrum analysis.

DETAILED DESCRIPTION

Figure 1A:
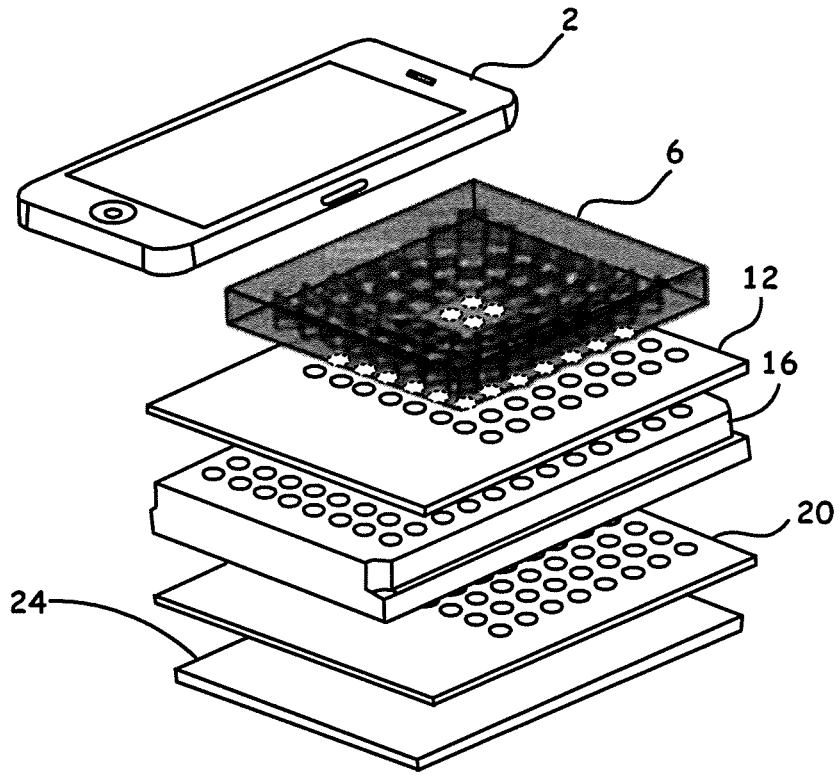
FIG. 1A shows an example breakdown of the components of note for a Portable Microplate Reader example platform embodiment, i.e., a high-throughput smartphone optical platform (HiSOP), as disclosed herein.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The embodiments herein provide for a methodology and configurations to achieve multichannel optical spectral sensing with nanometer resolution via the incorporation of, for example a smartphone. Integration of the smartphone with coupled mechanical and optical component was enabled using, for example, 3D printing of a cradle that is designed to hold the phone with such other coupled components as well as array fabrication as coupled with vacuum forming processing or injection molding process. The result of such arrangements herein provides for an optical sensor that performs accurate and reliable spectral measurements. In particular, the sensors herein capture and interrogate optical changes (e.g., intensity) of sample at specific wavelengths or optical spectral shifts, based on colorimetric or fluorometric reaction(S) of exposed chemical or biological substances. As part of the methodology, the embodiments herein utilize a custom multi-view application to control the optical sensing parameters and to align desired samples to a corresponding channel. Spectra of interrogated samples, often in the visible spectrum from 400 nm up to about 700 nm, is then capable of being captured with a resolution of down to about 0.25 nm per pixel.

Accordingly, a non-limiting basis of the present embodiments is directed to a multichannel smartphone optical biosensor that is desirable for a high-throughput point-of-care diagnostic that has a low form factor, is light weight, and is of low cost.

Specific Description

As briefly discussed above, the embodiments herein are directed to a low-cost, compact, high-throughput optical sensing platform (HiSOP) for in situ high-throughput screening of immunoassays. The configurations herein often and preferably utilize a smartphone as the detector and as part of the analysis unit for biomedical, plant, animal, and environmental diagnosis. The smartphone in general is integrated with other mechanical and optical components (e.g., optical arrays), to include a micro-prism array alone or in combination with one or more lens arrays or as a monolithic micro-prism/lens array that redirects the light paths to provide optical information with a desired field-of-view (FOV). The result is a configuration that enables high-throughput screening of for example, multiplate assay samples (e.g., 64, 96 samples). It is to be noted that the fabrication of the prism (e.g., to include up to about 96 prisms) and/or lens arrays, so as to aid in configuring a desired optical field of view, can include diamond machining processes.

However, it is to be appreciated that optical components that include the arrays disclosed herein can also be fabricated using a 3D printing and vacuum forming process or injection molding process to fabricate the components, as discussed below, which beneficially, also lowers the overall cost of the disclosed components.

Turning now to the drawings, FIG. 1A, while not showing all components for ease of understanding, illustrates an example breakdown of the components of note for a Portable Microplate Reader example platform embodiment, i.e., a high-throughput smartphone optical platform (HiSOP), as disclosed herein. It is to be noted that all example embodiments disclosed herein in the figures will use similar reference numbers for like components, FIG. 1A thus shows a detector/analysis unit processor (i.e., smartphone 2), a prism array 6 (here an example 8×8 prism array for a 96-well plate), a top aperture array 12, a microtiter (microplate array) 16, a bottom aperture array 20 and a backlight panel 24. It is to be noted that the backlight panel 24 can often be a configured LED backlight panel as the illumination light source. A beneficial LED backlight panel often is a 112 mm×88 mm×3 mm illumination light source which greatly reduces both size and cost. Other types of light sources, such as, a continuous light (e.g., Xenon bulbs) source, lasers, etc., can also be used. It is also to be appreciated that while the processor is primarily directed to a smartphone 2 as a preferred embodiment, the configurations are not just limited to smartphones 2 as the detector/processor. Other processors, such as a laptop, a tablet (e.g., an IPAD), and a personal digital assistant (PDA) that couples directly or wirelessly (i.e., to a configured smartphone 2) to the embodiments herein, can also be utilized without departing from the spirit and scope of the invention.

Figure 1B:
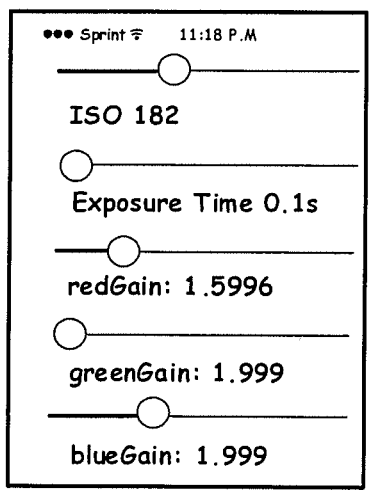
FIG. 1B shows a representative graphical user interface (GUI) to control ISO value (shutter speed, aperture and sensitivity), exposure time, and white balance, of Portable Microplate Readers disclosed herein.
Figure 2A:
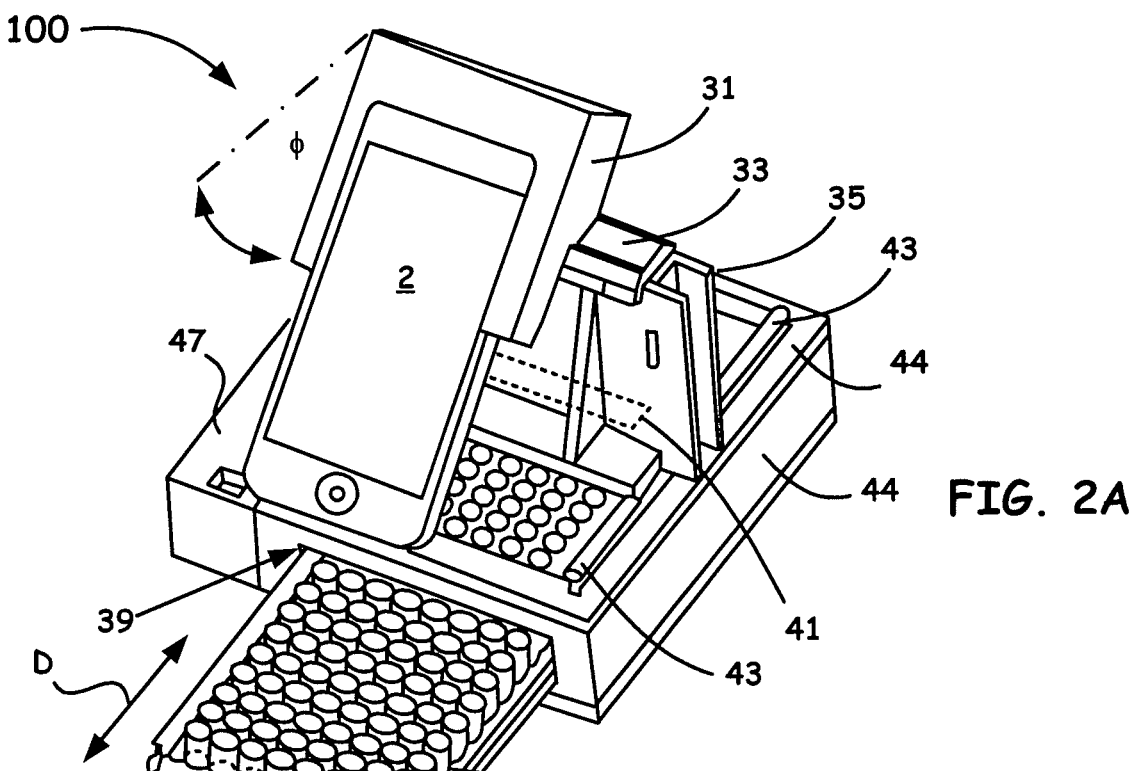
FIG. 2A shows a 3D assembly perspective of an 8-channel Portable Microplate Reader example platform embodiment (i.e, a HiSOP) configured with a grating, as disclosed herein.
Figure 2B:
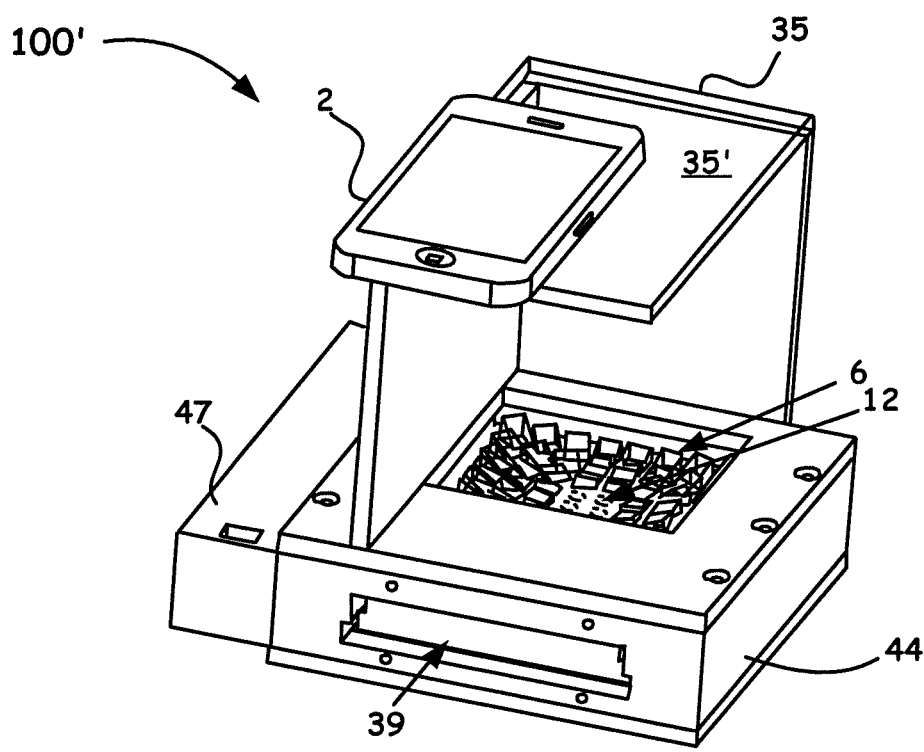
FIG. 2B shows a second 3D assembly perspective of an 8-channel Portable Microplate Reader example platform embodiment (i.e, a HiSOP), configured without a grating, as disclosed herein.

It is to be appreciated that a mobile application (App) is disclosed herein as a companion for the HiSOP, as generally shown in FIG. 2A and FIG. 2B and other disclosed embodiments. Because a smartphone 2 camera utilized herein can automatically adjust camera parameters, which lead to unwanted and inconsistent data errors, the custom and unique App can manually control camera parameters, such as focus, ISO value (shutter speed, aperture and sensitivity), exposure time, and white balance, as shown by the representative graphical user interface (GUI) in FIG. 1B.

Figure 1C:
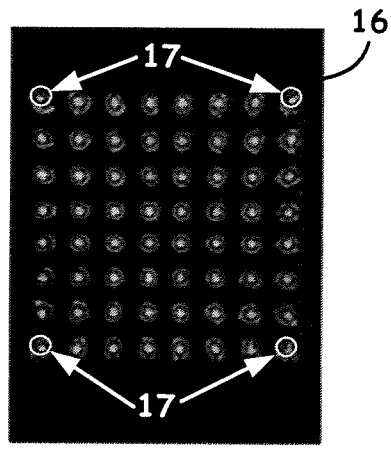
FIG. 1C shows a process using a custom phone app to align a smartphone camera with the samples configured in a given microplate array.

The App is also designed to align the smartphone camera with the samples configured in a given microplate array 6, as shown in FIG. 1A and as shown in FIG. 1C. In the disclosed herein App, four alignment circles 17, as shown in FIG. 1C, are used to align with the wells on the four corners of a microplate array 16 (not shown to scale). With this alignment function, the captured images are thus capable of showing the same well positions. For data processing, the utilized App can be connected to a cloud-based server. A MATLAB (Mathworks, Mass., USA) Graphical User Interface (GUI) program provided the App configuration. As an illustrative example, each time, 5 pictures are taken continuously by the App. In digital color images, red (R), green (G), and blue (B) are three main channel types (color models). For results disclosed herein as an example, Green (G) and Blue (B) channels are assessed independently by two different color dyes. In each well, the light intensities of a circular area, located in the center of each well (a radius of 25 pixels), are read by the self-built MATLAB program. The average light intensity is analyzed and converted to absorbance by calculating the 5 pictures of each well and normalizing to the light intensity of deionized (DI) water.

While the App disclosed above can be connected to a cloud based server for data processing, it is to be noted that another beneficial aspect of the present application includes using the communication (i.e., wireless) means of the smartphone 2 to also connect to and compare reference absorption and/or any optical information for a variety of substances that are stored as database records from a number of databases remotely located. If a match is found (e.g., the sample absorption and/or any optical information and the reference information for a particular sample agree substantially), then a response signal can be sent to the smartphone 2 that indicates to a system operator that identification of a given sample was successful, and provides the name of the identified substance. If a sample appears on a list as a deleterious substance, the operator can be alerted vis the smartphone 2 that a deleterious substance has been detected. The signal can also indicate to the system operator how closely the sample absorption and/or any optical information and the reference information agree. For example, numeric values of one or more metrics can be provided which indicate the extent of correspondence between the sample absorption information and the reference information on a numerical scale.

In some embodiments, the configurations herein (i.e., using a smartphone 2) can be connected to other devices over other types of networks, including isolated local area networks and/or cellular telephone networks. As non-limiting examples, such an arrangement can include commercial wireless interfaces, such as but not limited to, radio waves (WiFi), infrared (IrDA), or microwave technologies that also allow integration into other available portable personal devices, such as, but not limited to, cell phones, pagers, personal identification cards, laptops, etc.

FIG. 2A and FIG. 2B show 3D assembly perspectives of 8-channel Portable Microplate Reader example platform embodiments (i.e., a HiSOP), as generally designated by the reference numeral 100, 100' respectively, utilizing the components of note shown in FIG. 1A. The assembled setup, as shown in FIG. 2A as well as FIG. 2B and other embodiments disclosed herein to be discussed below, have a small form factor for ease of transport and handling. As a beneficial non-limiting arrangement, the readers of FIG. 2A and FIG. 2B are often but not necessarily constructed with dimensions of about the total size of 142 mm×160 mm×41 mm but can vary by tens of millimeters in any dimension depending on the construction desired.

As illustrated in FIG. 2A, the HiSOP platform 100 shows a smartphone 2 with a rear camera (not explicitly shown) often configured as a highly-pixilated sensor (e.g., 3264× 2448 pixels). The smartphone 2 is shown coupled to a cradle 31 with a configured means (e.g., disposed therein grooves (not shown), fasteners, etc.) to properly secure the smartphone 2. A rail 33 for slidably positioning the smartphone 2 enables positioning along an axis that is related to one or more rows of disposed wells in a microwell plate 38.

While not shown in FIG. 2A, a diffraction grating embedded in the cradle 31 is often incorporated to generate diffractive spectra. As an example beneficial arrangement, a first order diffractive angle of about 39.5° can be utilized that is designed for green wavelengths. A 45° angle (denoted as ϕ in FIG. 2A) is often utilized in this design. However, it is to be appreciated that other diffractive order grating designs can also be utilized when desiring to interrogate different spectral information. Using such a design enables a first-order diffraction spectrum to be captured by the smartphone 2 camera. Different types of diffraction gratings by different manufacturing processes, such as glass diffraction gratings, diffraction grating films, plastic diffraction gratings, holographic gratings, etc., can also be used in the embodiments herein.

It is to be noted that the lenses in the smartphone 2 aid in capturing the spectrum. The cradle 31 is notably designed to hold both the smartphone 2 and the grating (not shown) in a secured fashion. A support 35 is utilized to keep a minimum distance (e.g., up to about 90 mm or greater where necessary) between the grating (not shown) and the top surface of the microplate array 16. The support 35 is also shown to operate with a configured slit aperture 41 (shown in phantom). In particular, as the support 35 is slidably moved along coupled rails 43, the configured slit aperture 41 allows light from only a single row (column) to reach the grating to avoid interference (crosstalk) from different rows (columns). Accordingly, samples can be scanned from one row (column) to the next of the microplate array 16 by using the configured rails 43 (only one shown) configured and secured at the top of the microplate holder 44 for movement of the coupled support 35 and the slit aperture 41. Power for components in need (e.g., 24 V DC backlight panel 24) within the platform 100 is also provided by a battery compartment 47.

As also shown in FIG. 2A, the microplate array 16 is easily and slidably moved (denoted by the letter D and double arrows) into and out of a microplate aperture 39 configured into an HiSOP body 44. Such a HiSOP body 44 is designed to hold all the other noted components that include the backlight panel 24 and the top and bottom aperture arrays 12, 20. In particular, the HiSOP body 44 is adapted to hold not only the backlight panel 24, the top and bottom aperture arrays 12, 20, and is configured to slidably receive the microplate 16 (e.g., a 96-well microplate array), but is also adapted to hold the prism array 6, as shown in FIG. 1A and FIG. 2B as well, although not shown in FIG. 2A.

As illustrated in FIG. 2B, the platform 100' shows a smartphone 2 of similar construction as to that shown in FIG. 2A. In FIG. 2B however, while platform 100' is like that shown in FIG. 2A, the smartphone 2 in this arrangement is now shown to rest on a support base 35' that is coupled to the support shown in FIG. 2B. The premise is essentially the same wherein the support provides for a minimum distance (e.g., often up to about 100 mm or greater in some arrangements) to the top surface of, for example, the prism array 6 (shown in FIG. 1A). In such an embodiment, a user can quickly position the smartphone along the support base 35' for ease of imaging desired wells in a given microplate array 16 similar to that shown in FIG. 2A. While not shown specifically in FIG. 2B, a provided microplate 38 is slidably moved into and out of a microplate aperture 39 configured into an HiSOP body 44, as was discussed above for FIG. 2A. Thus, similar to the discussion above for the embodiment shown in FIG. 2A, the HiSOP body 44 of FIG. 2B is designed to hold all the other noted components that include the backlight panel 24 and the top and bottom aperture arrays 12, 20, the microplate array 16 (e.g., a 96-well microplate array), and the prism array 6, as now explicitly shown FIG. 2B.

In a method of construction for both FIG. 2A and FIG. 2B, inside the HiSOP body 44, the top and bottom aperture arrays 12, 20 are pre-aligned with the microplate array 16 position and fixed by, for example, gluing. Aperture array 20 (often, but not necessarily having same or designed larger apertures in the array (e.g., 6 mm) than the apertures in array 12 (e.g., 4 mm)), are placed in the HiSOP body 44 therebetween the backlight panel 24 and the microplate array 16. Aperture array 12 is placed in the HiSOP body 44 above and adjacent the microplate array 16.

Specifically, each aperture for the arrays 12, 20 are aligned with each well of the microplate, and the LED backlight panel is fixed beneath the bottom aperture array 20. Such a beneficial arrangement of the aperture arrays 12, 16 as sandwiched adjacent but about the microplate array 16, are thus in precise alignment so that light only passes through microwells configured in the microplate array 16 and the areas between respective wells of the microplate array 16 are substantially blocked. It is to be appreciated that the aperture arrays 12, 20 herein are often made by laser cutting pieces of acrylic sheet, e.g., ⅟₃₂ in. thick, with configured desired aperture diameters. However, it is also to be noted that other manufacturing methods and materials can also be utilized where warranted.

It is also to be noted the prism array 6 (as shown in FIG. 1A and FIG. 2B) is aligned above the top aperture array and secured by a top cover lid 44' of the HiSOP body 44, as shown in FIG. 2A. As part of an example manufacturing process, the main holder (i.e., HiSOP body 44), the battery compartment 47, the cradle 31, the rail 33, the support 35, and even the prims arrays 6, etc. can be 3D printed for ease of reproducible construction of components.

In particular, a large number of the components for the disclosed embodiments herein have been demonstrated to be fabricated with a 3D printer (e.g., uPrint SE Plus, Stratasys, Eden Prairie, Minn., USA), a technique that allows for simultaneous printing of various materials. 3D printers are beneficial for the example embodiments herein (e.g., as shown in FIG. 2A) because the ultimate shape of the desired object (i.e., the cradle 31, as shown in FIG. 2A) can be specified by a computer or an operator using a computer interface to a 3D printer. 3D printing also enables resultant constructed components to be consistent because it is constituted of output materials, e.g., polymers, plastics, composites, etc., that the incorporated printer uses. In some cases, more than one composite may be used. To illustrate an example material for particular components, for both the HiSOP body 44 and the battery compartment 47 are often 3D printed by using opaque ABS (Acrylonitrile-Butadiene-Styrene), which is an opaque thermoplastic polymer.

However, while a 3D printer has been used to make the example embodiments disclosed herein, e.g. as shown in FIG. 2A, it is also to be understood that other techniques may additionally be used for making the disclosed structures of the present application. For example, other techniques can include block copolymer chemistry, rapid prototyping, laser sintering, interference lithography, photolithography, stereo lithography, and self-propagating polymer waveguides. In addition, other manufacturing processing techniques to make the embodiments disclosed herein include, but are not limited to, injection molding, thermal forming, as well as any other suitable process known to those skilled in the art.

Prism Array

The preferred embodiments herein utilize microprism arrays 6, such as that shown in FIG. 1A and as better shown in FIG. 4A and FIG. 4B (to be discussed below) to tilt the light from each well of a microplate into a detector, such as a camera configured with a smartphone 2. Integrated with microprism arrays disclosed herein, optical signals from all the wells can thus be clearly and fully captured.

Figure 3A:
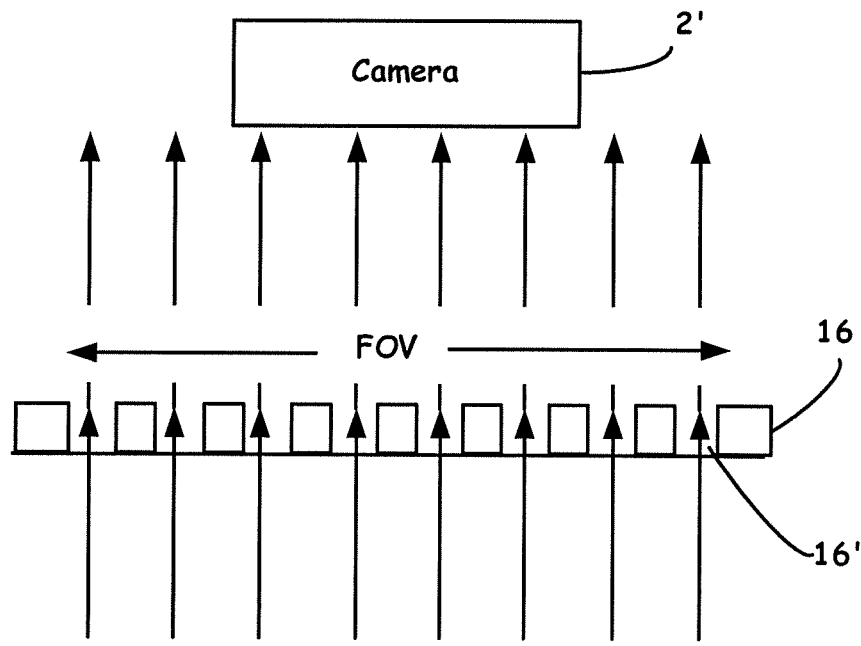
FIG. 3A generally illustrates the principle of image capture of a microplate without a prism array.
Figure 3B:
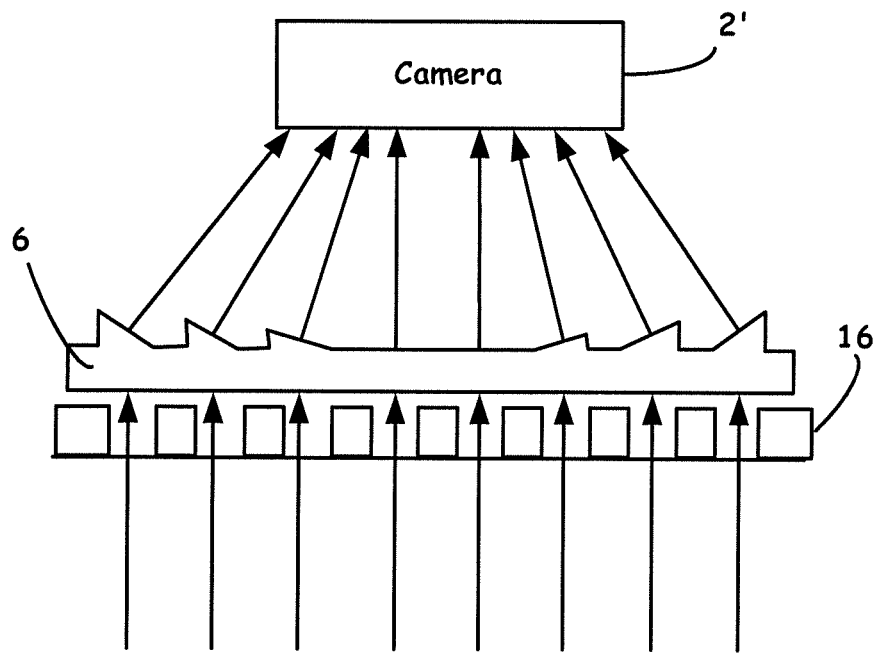
FIG. 3B generally illustrates the principle of image capture of a microplate with a prism array.
Figure 4B:
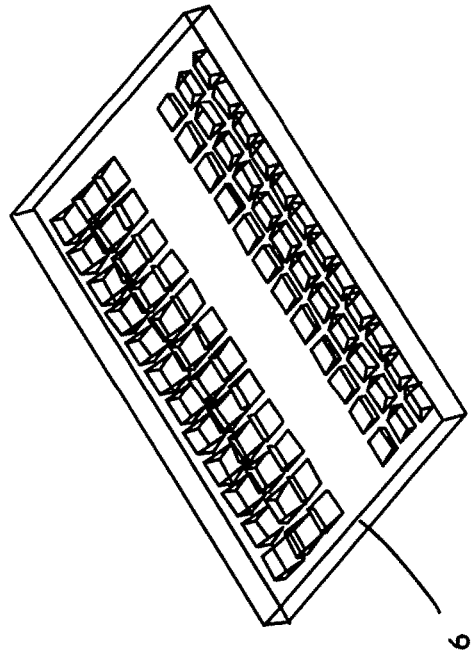
FIG. 4B is an example of an 8×12 prism array wherein each prism of this design covers a desired area of a standard 96-well microplate.
Figure 4A:
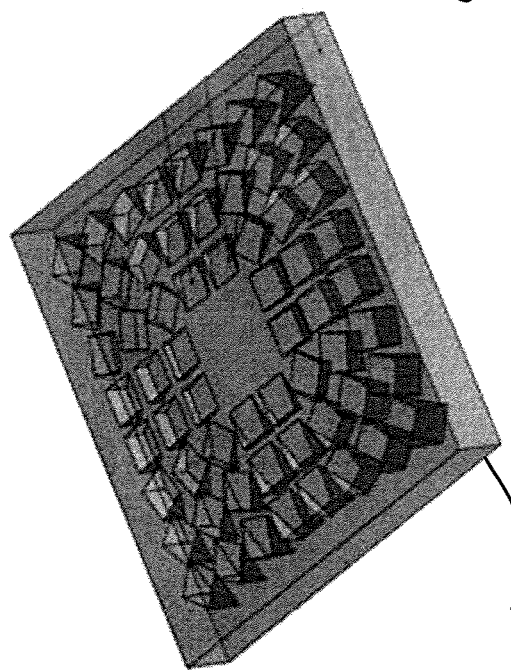
FIG. 4A shows an example configuration of a 8-by-8 prism array for a standard 96-well microplate.

With these prism arrays 6, as best shown in FIG. 4A and FIG. 4B, a user is able to capture the full image of all the wells on a microplate by the phone 2 camera or, for example, a consumer digital camera or other configured detector capable of imaging the optical information received from the devices herein. To aid in understanding, FIG. 3A and FIG. 3B generally illustrate the principle of image capture of a microplate without a prism array, and with a prism array.

As shown in FIG. 3A because the microplate 16 has a larger FOV than that of the lensing capability of the camera, not all of the wells (e.g., well 16') can be fully and clearly seen when using a camera to capture an image of a microplate. In particular, it is evident from FIG. 3A that only the wells in the center can be fully seen and the wells on the outside (e.g., well 16') are partially blocked by the wall of each well. Due to this un-matching issue, it is not possible to do the precise analysis of the diagnostic/detection assays by only using a camera 2' and a microplate array 16 alone.

The principle of a prism array 6 is shown in FIG. 3B. A prism can be used to tilt the light to a predesigned direction. By using such a prism array 6, optical signal(s) from all the wells can be clearly and fully captured, as can be seen from FIG. 3B.

Returning to FIG. 4A and FIG. 4B, such prism arrays 6 illustrate constructed optical components that enable, for example, the disclosed platforms (e.g., platform 100, as shown in FIG. 2A) herein to operate. It is to be noted that the number of prisms, the size of each prism, and the tilting angle of each prism on each design can be changed depending on the number and size of wells on a microplate and also depending on the application.

Accordingly, FIG. 4A is illustrative of an example configuration of a 8-by-8 prism array 6 for a standard 96-well microplate. Each prism of this design covers the area of one well of a standard 96-well microplate. The titling angle of each prism is designed to tilt the light coming from the well to be within the FOV of a camera. All prisms are tilted toward the center of the microplate, thus signals from a 8×8 array of wells on a microplate can be captured in one picture.

Accordingly, a designed microprism array (e.g., 6) plays a crucial role to direct light from each well in a microplate. Table 1 shows design parameters for the prism array of FIG. 4A. It is to be noted that the four wells in the center of a standard 96-well (See columns 4, 5 corresponding to rows D and E in Table 1 below) do not need light deviation, and as such, the tilting angles are zero. Table 1 below shows light deviation angles of each prism for 8×8 wells on a 96 well microplate (the values in the brackets are the prism Apex angles).

TABLE 1

|   | 1 | 2 | 3 | 4 | 5 | 6 | 7 | 8 |
|---|---|---|---|---|---|---|---|---|
| A | 20.2° | 17.2° | 15.3° | 14.56° | 14.56° | 15.3° | 17.2° | 20.2° |
|   | (45.7°) | (40.2°) | (36.1°) | (34.5°) | (34.5°) | (36.1°) | (40.2°) | (45.7°) |
| B | 17.3° | 13.8° | 10.9° | 9.8° | 9.8° | 10.9° | 13.8° | 17.3° |
|   | (40.2°) | (32.8°) | (26.6°) | (24.0°) | (24.0°) | (26.6°) | (32.8°) | (40.2°) |

TABLE 1-continued

|   | 1 | 2 | 3 | 4 | 5 | 6 | 7 | 8 |
|---|---|---|---|---|---|---|---|---|
| C | 15.3° | 10.9° | 7.0° | 4.9° | 4.9° | 7.0° | 10.9° | 15.3° |
|   | (36.1°) | (26.6°) | (17.2°) | (12.3°) | (12.3°) | (17.2°) | (26.6°) | (36.1°) |
| D | 14.6° | 9.8° | 4.9° | 0° | 0° | 4.9° | 9.8° | 14.6° |
|   | (34.5°) | (24.0°) | (12.3°) | (0°) | (0°) | (12.3°) | (24.0°) | (34.5°) |
| E | 14.6° | 9.8° | 4.9° | 0° | 0° | 4.9° | 9.8° | 14.6° |
|   | (34.5°) | (24.0°) | (12.3°) | (0°) | (0°) | (12.3°) | (24.0°) | (34.5°) |
| F | 15.3° | 10.9° | 7.0° | 4.9° | 4.9° | 7.0° | 10.9° | 15.3° |
|   | (36.1°) | (26.6°) | (17.2°) | (12.3°) | (12.3°) | (17.2°) | (26.6°) | (36.1°) |
| G | 17.3° | 13.8° | 10.9° | 9.8° | 9.8° | 10.9° | 13.8° | 17.3° |
|   | (40.2°) | (32.8°) | (26.6°) | (24.0°) | (24.0°) | (26.6°) | (32.8°) | (40.2°) |
| H | 20.2° | 17.2° | 15.3° | 14.56° | 14.56° | 15.3° | 17.2° | 20.2° |
|   | (45.7°) | (40.2°) | (36.1°) | (34.5°) | (34.5°) | (36.1°) | (40.2°) | (45.7°) |

The second prism array design 16' shown in FIG. 4B is an example of an 8×12 prism array wherein each prism of this design covers a desired area of a standard 96-well microplate. In each row, all prisms are tilted toward the center of the row, however the center two prisms have computed zero deviation angles and thus are designed to be flat. Every row has the same design. The prism apex angle and light deviation angle of each prism in a row is shown in Table 2, (note: the values in the brackets are the prism Apex angles).

TABLE 2

| 14.6° | 9.8° | 4.9° | 0° | 0° | 4.9° | 9.8° | 14.6° |
|---|---|---|---|---|---|---|---|
| (34.5°) | (24.0°) | (12.3°) | (0°) | (0°) | (12.3°) | (24.0°) | (34.5°) |

Since the microprism array is symmetric about the center in both vertical and horizontal directions, each microprism is tilted toward the center of the array. Polydimethylsiloxane (PDMS) is a non-limiting example material (glass is another example) used to fabricate a microprism array 16, as disclosed herein. To illustrate the invention herein, the tilting angles were calculated by using 1.39 as material refractive index and by setting the working distance as 100 mm between the camera and the microprism array. However, the design is modified if different materials having different indices of refraction are utilized.

Figure 4C:
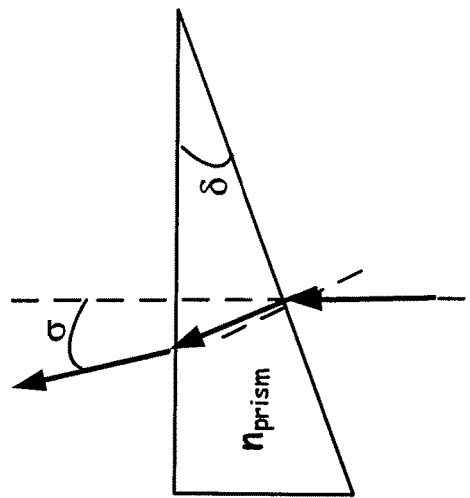
FIG. 4C illustrates the principle of a light ray trace traversing one microprism.

The principle of a microprism is schematically shown in FIG. 4C. The incident light beam will be deviated to an angle σ, calculated by the following Equation:

$$\tan\frac{\sigma}{2} = \frac{\sin\frac{\delta}{2}}{\frac{n_{prism}}{n_0} - \cos\frac{\delta}{2}}$$

where δ is the angle of refraction (prism apex angle), $n_{prism}$ is the refractive index of the prism material, and $n_0$ is the refractive index of air. To enlarge the FOV of a microplate so that every well can be clearly seen by a given sensor, a prism array is thus designed, as discussed above, to tilt the light of one well to match the FOV of the imaging camera. It is to be noted that the tilting angles and directions are different for each microprism depending on the distance and location of the well to the center of the camera. The designed microprism array can solve the FOV non-matching problem and achieve a miniaturized high-throughput screening mobile point of care (MPOC) device, as disclosed herein.

Fabrication of disclosed microprism arrays entails a hybrid manufacturing process In such a process, a negative mold of the prism array is first fabricated by using a fused deposition 3D printing method. Then vacuum forming was used to form a layer of thermoplastic sheet (Polyethylene terephthalate (PET)) on the surface of the printed mold. By using such a layer of thermoplastic sheet, the surface quality of the mold is improved. After vacuum molding, transparent resin (Polydimethylsiloxane (PDMS) as an example, is then poured onto this mold. After fully curing, a transparent prism array is resultantly fabricated. Other thermoplastic materials for use in vacuum forming, such as polystyrene, acrylic, and etc., can also be used to fabricate the mold of the designed prism assays. Moreover, other thermal or light curable transparent epoxy can also be used to fabricate the prism array.

Figure 5A:
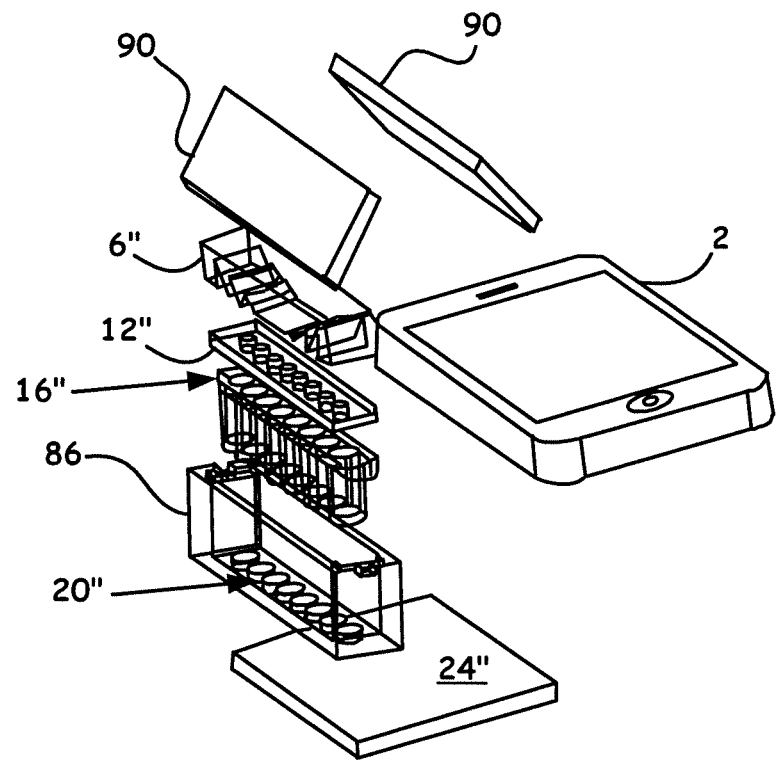
FIG. 5A shows an example breakdown of the components of note for Portable Single-Stripe-Microplate Reader embodiment, i.e., a high-throughput smartphone optical platform (HiSOP), as disclosed herein.
Figure 5B:
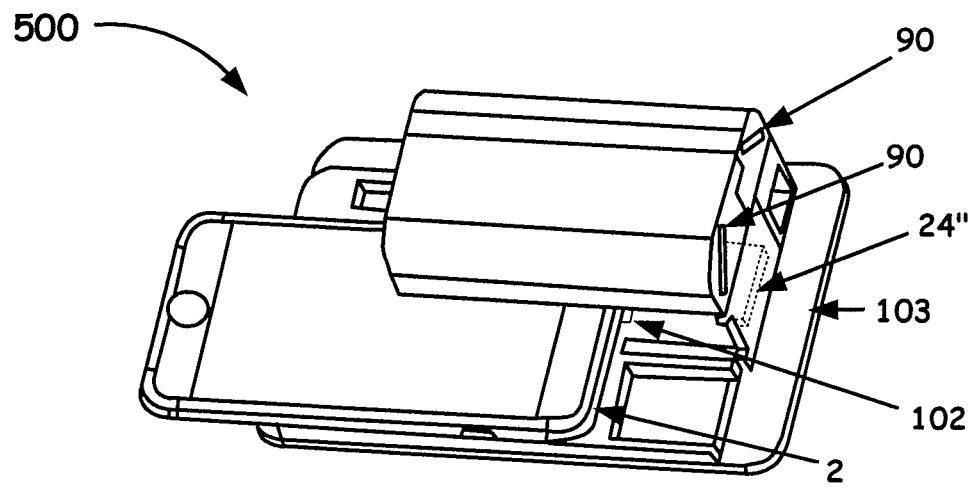
FIG. 5B shows a 3D assembly perspective of a Portable Single-Stripe-Microplate Reader embodiment.

Turning again back to the drawings, FIG. 5A and FIG. 5B together illustrate another beneficial (HiSOP) Portable Microplate Reader example platform embodiment. FIG. 5A, similar to the discussion for the breakdown of components in FIG. 1A above, is a breakdown of the components of note for a Portable Single-Stripe-Microplate Reader. In particular, FIG. 5A shows a detector/analysis unit processor (i.e., smartphone 2), a single-stripe-prism array 6", a top single-stripe-aperture array 12", a single-stripe-microplate array 16", a bottom single-stripe-aperture array 20" integrated with a microplate single-stripe-holder 86 a backlight panel 24", and at least two reflective components 90 designed to direct light to the front camera of the smartphone 2 to enable compactness of the overall design.

FIG. 5B shows an assembled smartphone Portable Single-Stripe-Microplate Reader 500. To appreciate the small form factor, representative dimensions of the device are on the order of up to about 200 mm by up to 60 mm (working design is 160 mm by 56 mm), the main holder length is up to about 100 mm and with a height of up to about 50 mm. The light path length from the prism array to the front camera of the smartphone is up to about 100 mm, often about 80 mm. In the figure for the components shown, a front camera of a smartphone 2 is used. The two reflectors 90 are used to direct the light path and thus reduce the overall size of the device.

This device can use an external light bulb source 102 or LED (placed between the smartphone and the backlight panel). Another light source is the flash light of the smartphone (on the backside of the smartphone with a configured App to control the flash light while working with front camera). Operationally, the device works similar to that shown in FIG. 2B as discussed above with the variation being that of a single-strip-microplate being examined instead of a two dimensional array, as previously shown.

In particular, to provide the compactness, the two mirrors 90 are used to bend light paths and guide light signals to the front camera of a smartphone 2. Other Optical arrangements can include roof prisms, etc. to be incorporated to bend light paths and guide light signals to the front camera of a smartphone 2 when desired. No smartphone holder is used and any smartphone with a front camera can be adapted in the configuration shown in FIG. 5B.

Three mini LED light bulbs were used as the light source 102 and two 1.5V button batteries provide power for the lights. However, other light sources are also capable of being used, as discussed above. In this configuration, however, the LED lights and batteries were embedded into an acrylic board that is placed above a base board 103. To generate uniform light field, the backlight panel 24", is placed under the bottom aperture array 24" and LED lights illuminate the backlight panel 24" from one side. The single-stripe-microplate 16" is placed into the single-stripe-holder 86 and slidably guided into and out of the device from one end. The base board 103, light source board, and aperture arrays 16", 20" are laser cut from acrylic boards. The prism array was made by casting Polydimethylsiloxane (PDMS, SYLGARD®, Dow Corning) on a laser cut prism array mold. Other components were 3D printed and assembled. The device has example dimensions of a height of 50 mm, a width of 100 mm, and a length of about 160 mm.

integrated with a microplate single-stripe-holder 86 and a backlight panel 24" array of wells (or one stripe of 8 wells) is inserted into the reader. The single-stripe-prism array 6" as discussed above is used to tilt the light and reduce the field-of-view.

The illumination light source in this design is using the flash light of the smartphone 2. A light guide pipe 112 is used to guide light from the flash light to the bottom of the stripe of the micro wells. A diffuser 114 enables uniform light to be received by the backlight panel 24", which is placed under the single-stripe-microplate array (not shown) to generate an overall uniform light field. Light passes through the single-stripe-microplate array with samples and generates a spectrum by using the light grating 109. The generated light spectrum is recorded by the backside camera of the same smartphone 2. Table 3 below shows light deviation angles and prism angles for a single-stripe-prism array while FIG. 6B shows an example configured single-stripe-prism array design for a standard 96-well microplate using the values taken from Table 3. To appreciate for illustrative purposes, the small form factor shown in FIG. 6B, the prism base size is 7 mm by 7 mm, the center to center distance is 9 mm.

TABLE 3

| Light deviation angle | 18.64° | 12.68° | 6.4° | 0° | 0° | 6.4° | 12.68° | 18.64° |
|---|---|---|---|---|---|---|---|---|
| Prism angle | 42.80° | 30.42° | 15.83° | 0° | 0° | 15.83° | 30.42° | 42.80° |

Figure 6A:
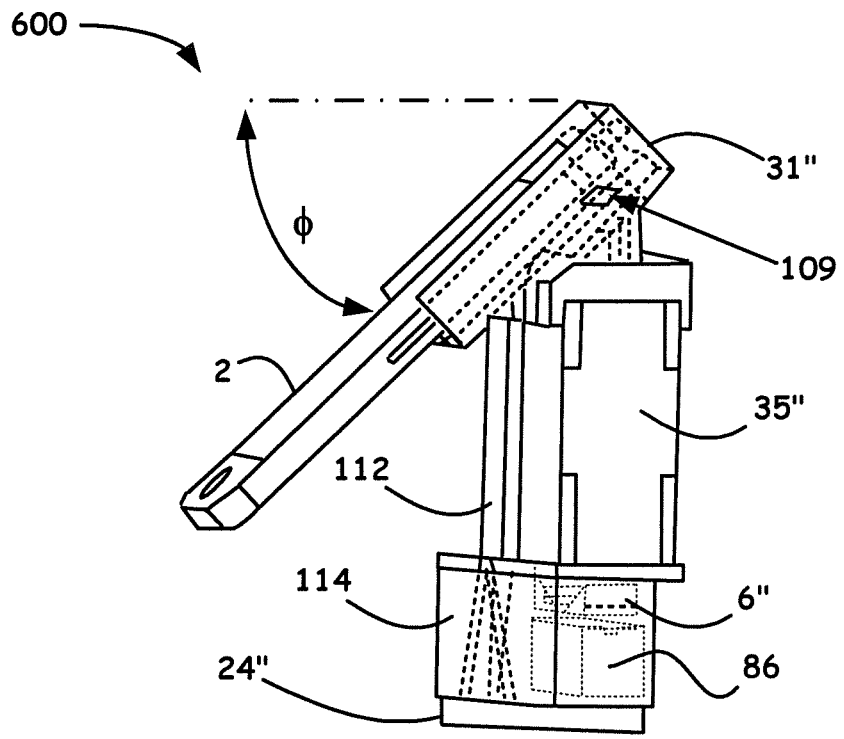
FIG. 6A shows another example 3D assembly perspective of a Portable Single-Stripe-Microplate Reader embodiment.
Figure 6B:
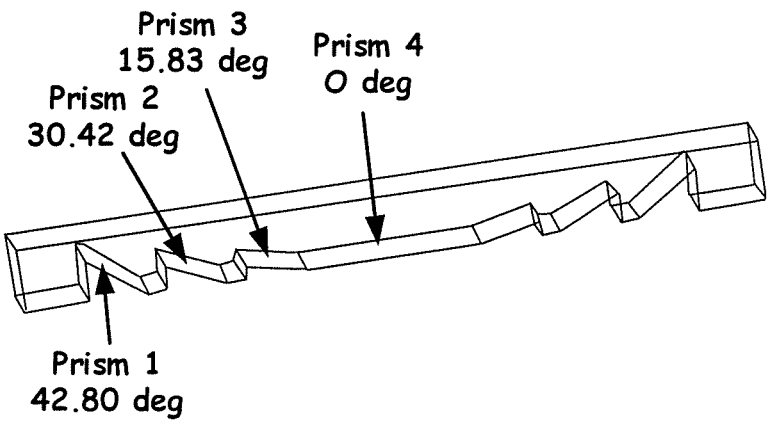
FIG. 6B shows an example configuration of a single-stripe-prism array for a standard 96-well microplate.

FIG. 6A illustrates yet another beneficial assembled smartphone (HiSOP) Portable Single-Stripe-Microplate Reader 600 example platform embodiment. In particular, FIG. 6A shows an assembled smartphone Portable Single-Stripe-Microplate Reader 600 (with having dimensions of about 100 mm by 82 mm). Platform 600, similar to the discussion for the device shown in FIG. 2A, a smartphone 2 with a rear camera (not explicitly shown) often configured as a highly-pixilated sensor (e.g., 3264×2448 pixels). The smartphone 2 is shown coupled to a cradle 33" with a configured means (e.g., disposed therein grooves (not shown), fasteners, etc.) to properly secure the smartphone 2.

A diffraction grating 109 embedded in the cradle 31 is often incorporated to generate diffractive spectra. As discussed above, a first order diffractive angle of about 39.5° can be utilized that is designed for green wavelengths. A 45° angle (denoted as ϕ in FIG. 2A) is often utilized in this design. However, it is to be appreciated that other diffractive order grating designs can also be utilized when desiring to interrogate different spectral information. Using such a design enables a first-order diffraction spectrum to be captured by the smartphone 2 camera. Different types of diffraction gratings by different manufacturing processes, such as glass diffraction gratings, diffraction grating films, plastic diffraction gratings, holographic gratings, etc., can also be used in the embodiments herein.

It is to be noted that the lenses in the smartphone 2 aid in capturing the spectrum. The cradle 31" is notably designed to hold both the smartphone 2 and the grating 109 in a secured fashion. A support 35" is utilized to keep a minimum distance between the grating (not shown) and the top surface of the microplate array (not shown).

Similar to the discussion for the Platform 500 of FIG. 5B, the design includes a smartphone 2, a single-stripe-prism array 6", a top single-stripe-aperture array (not shown), a single-stripe-microplate array (not shown) (or one stripe of 8 wells), bottom single-stripe-aperture array (not shown)

Figure 7A:
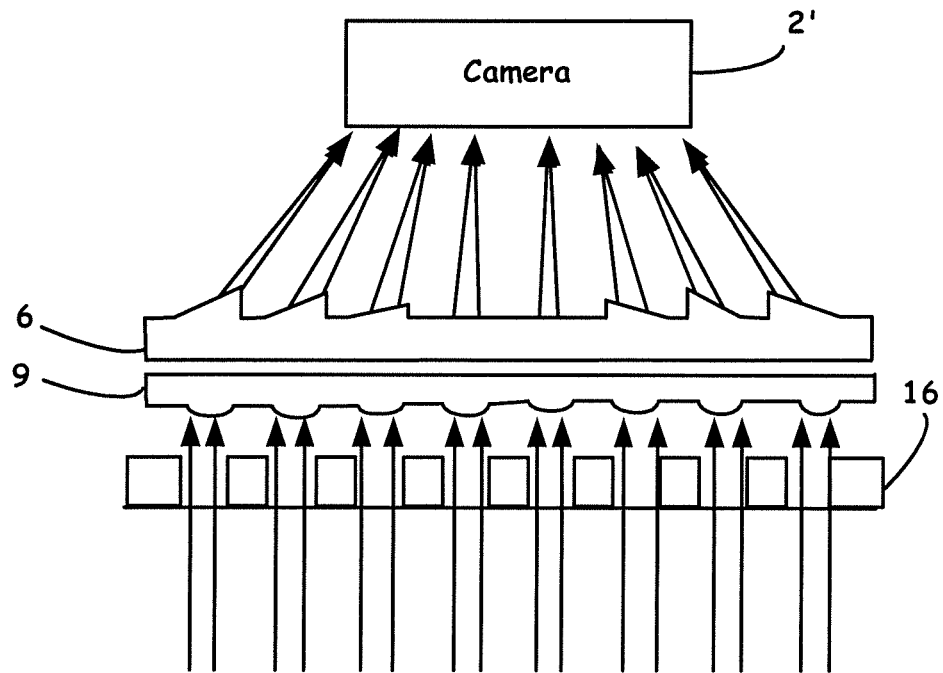
FIG. 7A illustrates a prismatic multilayer optical array design.
Figure 7B:
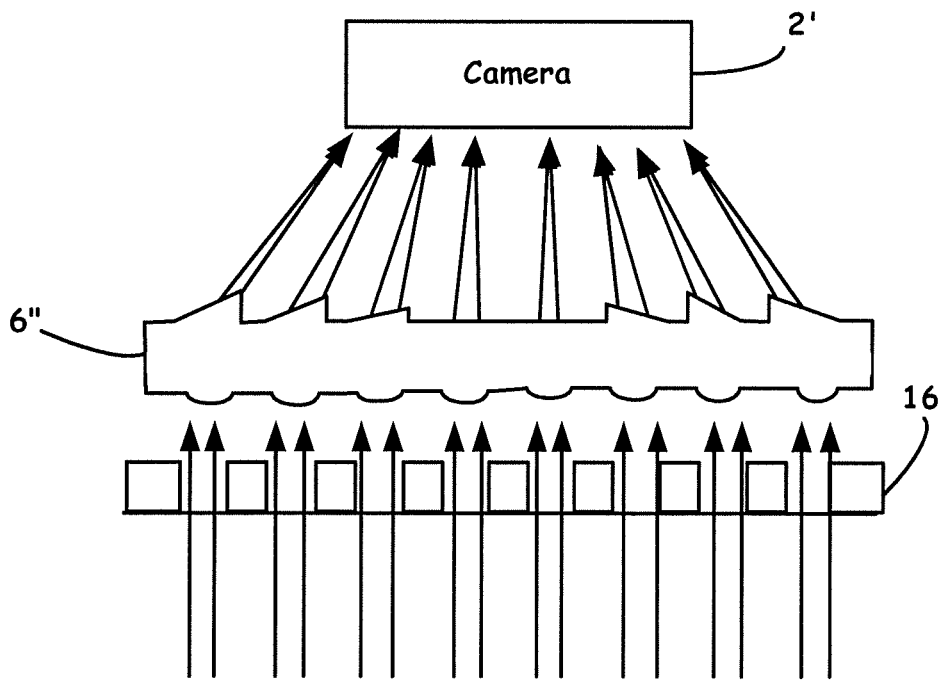
FIG. 7B illustrates a variation of a prismatic multilayer optical array design.

FIG. 7A and FIG. 7B are now shown to illustrate other prismatic multilayer optical array designs to correct a field of view so as to be incorporated into the HiSOP readers disclosed herein. By using the combination of several layers of array optics (e.g. prism arrays, lens arrays, mirror arrays, filter arrays, etc.), one can optimize light field adjustment, light focusing, light regulation, as well other functions.

FIG. 7A thus shows a single layer prism array 6 and one or more lens arrays 9 (one shown) capable of being constructed using methodologies disclosed herein. The lens arrays are used to focus stray light that does not enter the prism array 6 vertically to be captured by the detector (e.g., a camera 2'). It is thus to be noted that a number of layers of lens arrays can be used for such correction. To illustrate the principle, only one layer of prism array and one layer of lens array are used in FIG. 7A.

FIG. 7B illustrates a freeform prism array 6" (not traditional flat surface) used to achieve deviate light and focus light at the same time, similar to that shown in FIG. 7A so as to be captured by camera 2'. Such a freeform prism array 6" is also capable of being constructed using methodologies disclosed herein. In this design, one side or both sides of the prism can be a freeform surface and configured as a monolithic component. This design can achieve multiple functions and have an even greater compact size.

Figure 8:
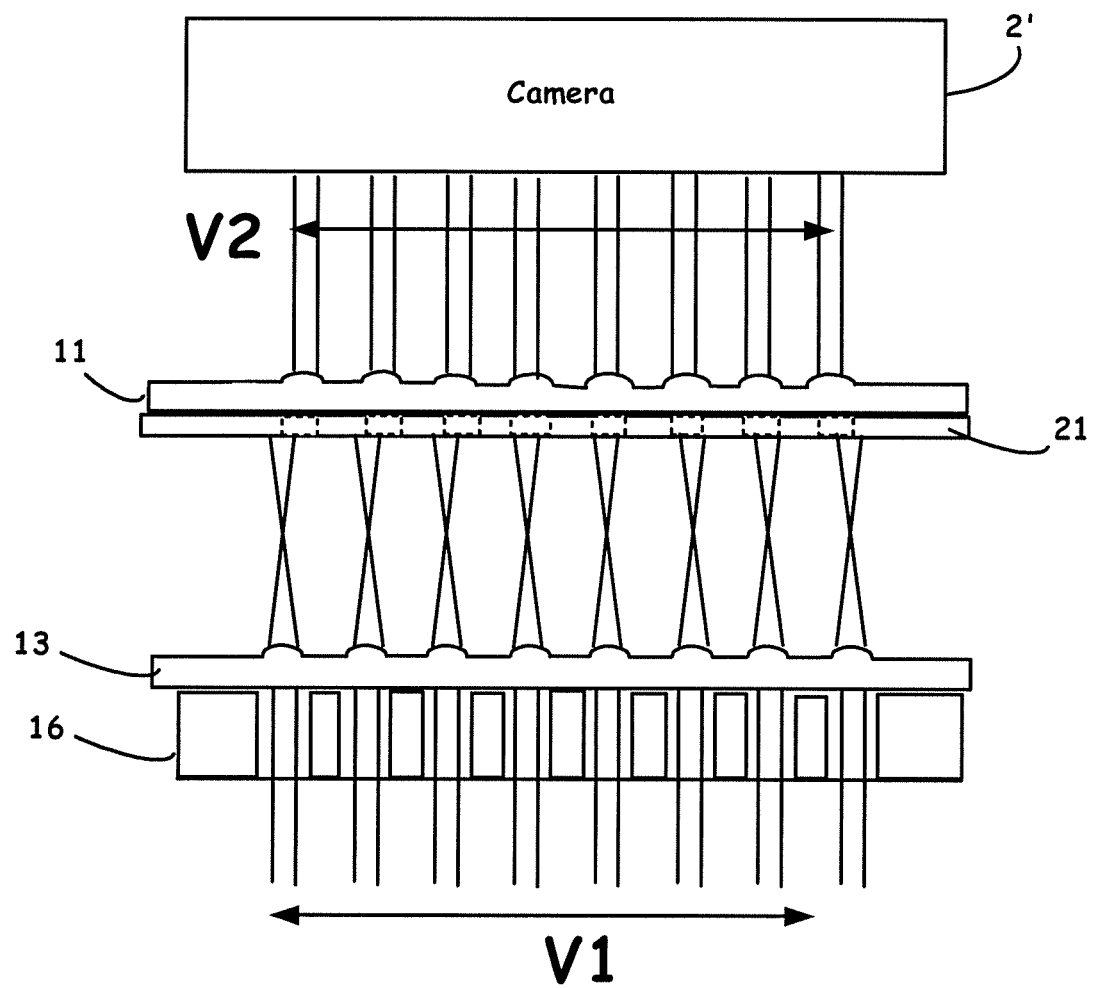
FIG. 8 shows a schematic principle of using two layers of decentered lens arrays to shrink the light field of a microplate to match that of a camera.

FIG. 8 shows a schematic principle of using two layers of decentered lens arrays to shrink the light field of a microplate to match that of a camera 2'. In addition to using a prism array, as disclosed herein, another beneficial embodiment includes configuring a compact Portable Microplate Reader using de-centered lens arrays.

As seen from FIG. 8, by using two layers (or more than two layers) of lens arrays 11, 13 (i.e., refractive optics) which have decentering lens positions often in combination with configured aperture arrays 21, a corrected field-of-view to optically interrogate microwell structures is enabled similar to that of using prismatic structures discussed above. The center distance of each lens-on-lens array 11 are slightly different with that of the lens center distance on lens array 13, thus the size of light field V1 can be reduced to V2 which is compatible with the FOV of a camera. In addition to steering light rays, one or more lens arrays can also be used for focusing light, reducing the distance from the camera to the microplate, and amplifying images in microplate signal reading.

To aid the reader in understanding the possible various embodiments of the present invention, the following provides results using various embodiments herein, of which is intended to be illustrative only, but not limiting thereof.

EXAMPLES

Preparation of Diluted Serial Color Dye Solutions. Rhodamine B (RhB, ≥95%), purchased from Sigma-Aldrich (St. Louis, Mo., USA), was serially diluted in DI water from 1 to 1 ng/µL with a total of 55 samples, and DI water was used as the reference. Curcumin (≥98%), purchased from Acros Organics (Geel, Belgium), was serially diluted in pure ethanol (200 proof) from 0.4 to 10.0 ng/µL with a total of 87 samples, and ethanol was used as the reference. Human IL-6 Immunoassays. The commercial human IL-6 in human serum ELISA kit was purchased from Invitrogen (Carlsbad, Calif., USA).

Standard procedures were followed to measure human IL-6 level in human serum with 14 samples. The concentration of serial dilute IL-6 standards in human serum ranges from 250 to 6 pg/mL. All samples were measured by our HiSOP, as disclosed herein, and the laboratory microplate reader (Tecan Safire2, Männedorf, Switzerland) for two replicates. The presented absorbance was the average values. Plant Virus Field Immunoassays. Six types of plant viruses were assayed by three ELISA methods as follows: (1) Grapevine leaf roll-associated virus 3 (GLRaV3), a virus that leads to the most important grapevine viral diseases in the genus Closterovirus. (2) Cherry leaf roll virus (CLRV), a pollen-transmitted virus located within pollen grains. CLRV often infects a variety of deciduous trees and shrubs in forested areas. After grinding infected/healthy leaf tissue or bud woods, GLRaV3 and CLRV were assayed by direct antibody sandwich ELISA, respectively. (3) Bean common mosaic virus-poty virus (BCMV-POTY), the most serious and widespread seed-transmitted type in beans. The tested beans were first soaked overnight and then ground, followed by indirect ELISA procedures using the poty virus antibodies. (4) Apple mosaic virus (ApMV), the most widespread apple virus, especially U.S. apple tree *Malus domestica*.

Since apple is the most widely grown fruit crop in Washington State, fast screening and elimination of apple mosaic disease is economically important to commercial apple cultivars. A double-antibody sandwich (DAS) ELISA was utilized for assaying the tested pollens. (5) Prune Dwarf Virus (PDV) and (6) *Prunus* necrotic ringspot virus (PNRSV), frequently encountered viruses infecting stone fruit trees, such as peach and cherry. Both viruses could be transmitted via budding, pollens, or grafting with infected wood. To detect PDV and PNRSV, respectively, DAS ELISA was performed. All tested samples were field sampled from farmers in the state of Washington and were measured by our HiSOP and the laboratory microplate reader (Multiskan Ascent, Thermo Fisher Scientific, Waltham, Mass., USA) for two replicates.

The presented absorbance was the average values. In field testing, there are no known standard concentration solutions to quantify virus infectious level. Therefore, the decision-making mainly relies on the results of reading instruments. The International Seeds Testing Association (ISTA) recommends using a negative-positive threshold of 2.5 times the background of healthy plant samples. Following this universal rule, we interpreted a readout 2.5 times higher than that of the control/untreated group as positive. It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

RESULTS

Assessment of HiSOP by Color Dye Solutions

Figure 9:
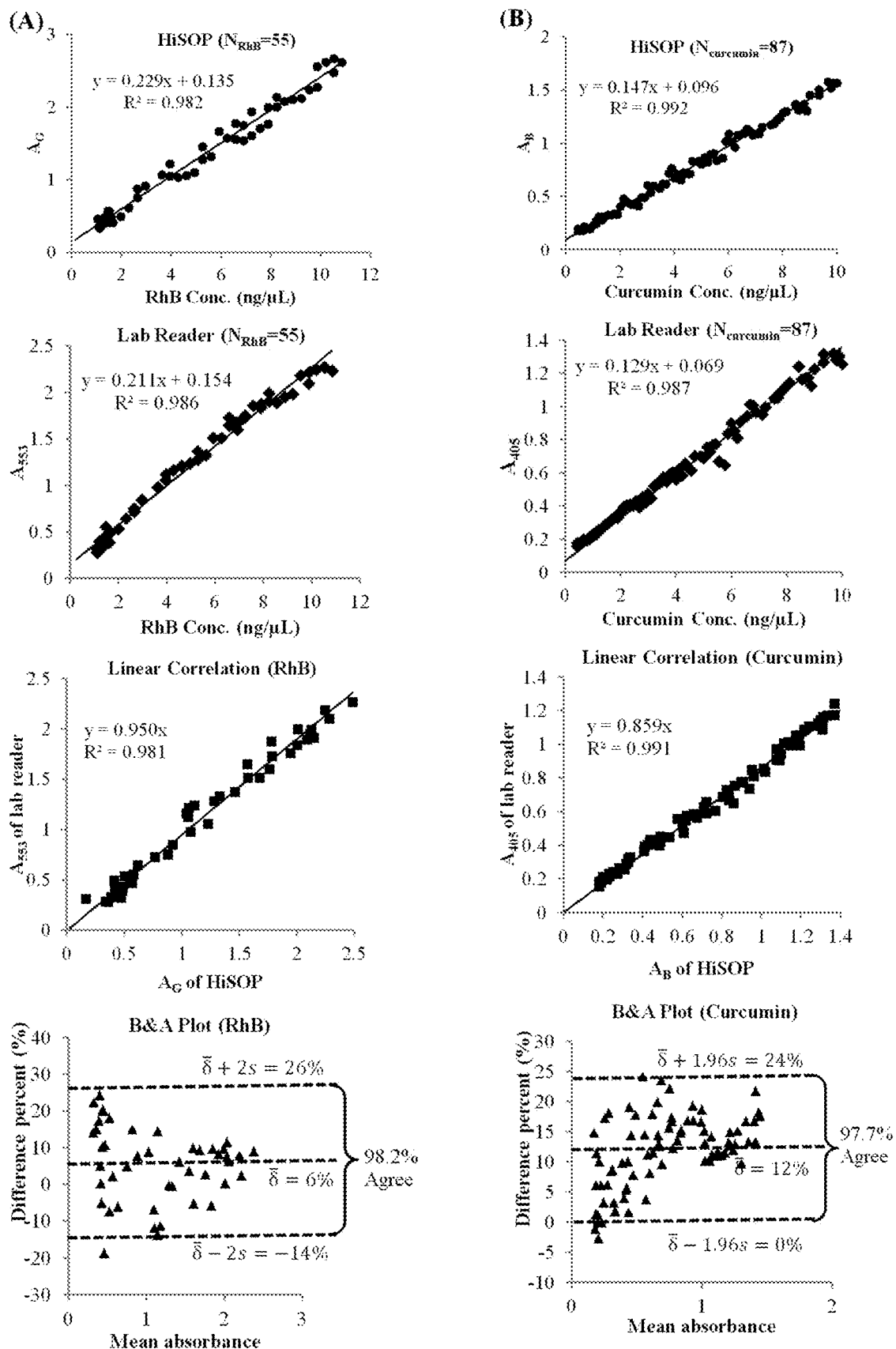
FIG. 9 shows linear regression and B&A plots of (A) RhB solutions absorbed in green channel (AG) and (B) curcumin solutions absorbed in blue channel (AB) read by HiSOP and compared with the lab reader at wavelengths 553 and 405 nm, respectively.

Two sets of color dye solutions were tested to assess G and B channels in color imaging processing on a HiSOP, as disclosed herein. FIG. 9 presents the measurements of two color dyes, RhB and curcumin, by HiSOP and lab reader. Columns (A) and (B) in FIG. 9 show the linear regression analysis of a total sample number, N, 55 RhB solutions and 87 curcumin solutions. The absorbance peak of the RhB solution is at 553 nm wavelength (A553) whose light channel is green (AG). In column (A), we validated HiSOP performance in G channel. In column (B), the absorbance peak of curcumin solution is at 405 nm wavelength (A405) whose light channel is blue (AB). The linear regression of the HiSOP in G and B channels both achieved relatively high accuracy levels, 98.2% and 99.2% respectively, and were comparable to the results from the lab reader (98.6% and 98.7%). The linear correlations (R2) between the HiSOP and lab readers are 0.981 in G channel and 0.991 in B channel, indicating very strong association between readers for these channels.

The other common approach in the clinical laboratory to analyze the agreement between two instruments is to examine the differences in a Bland-Altman plot (B&A plot). The difference percentage (%) was computed using the following Equation:

$$\text{difference percentage}(\%) = 100 \times \frac{A_{reader} - A_{HiSOP}}{(A_{reader} + A_{HiSOP})/2}$$

where Areader and AHiSOP are absorbance measured by the lab reader and the HiSOP, respectively. The mean and the standard deviation of these differences are presented by $\bar{\delta}$ and s, respectively. For a large sample size greater than 60, the 95% limit of agreement is calculated by $\bar{\delta} \pm 1.96$ s. For sample size less than 60, the formula is $\bar{\delta} \pm 2$ s.54 B&A recommended that 95% of the difference data points should lie within the limits of agreement. The B&A plots of RhB and curcumin demonstrated that the differences data points are satisfied within the limits (98.2% and 97.7%, respectively). By assessing G and B channels in the color imaging process, we successfully demonstrated the ability of quantification and the reliability by the HiSOP.

Validation of HiSOP by Immunoassaying Human IL-6 Biomarker

Figure 10:
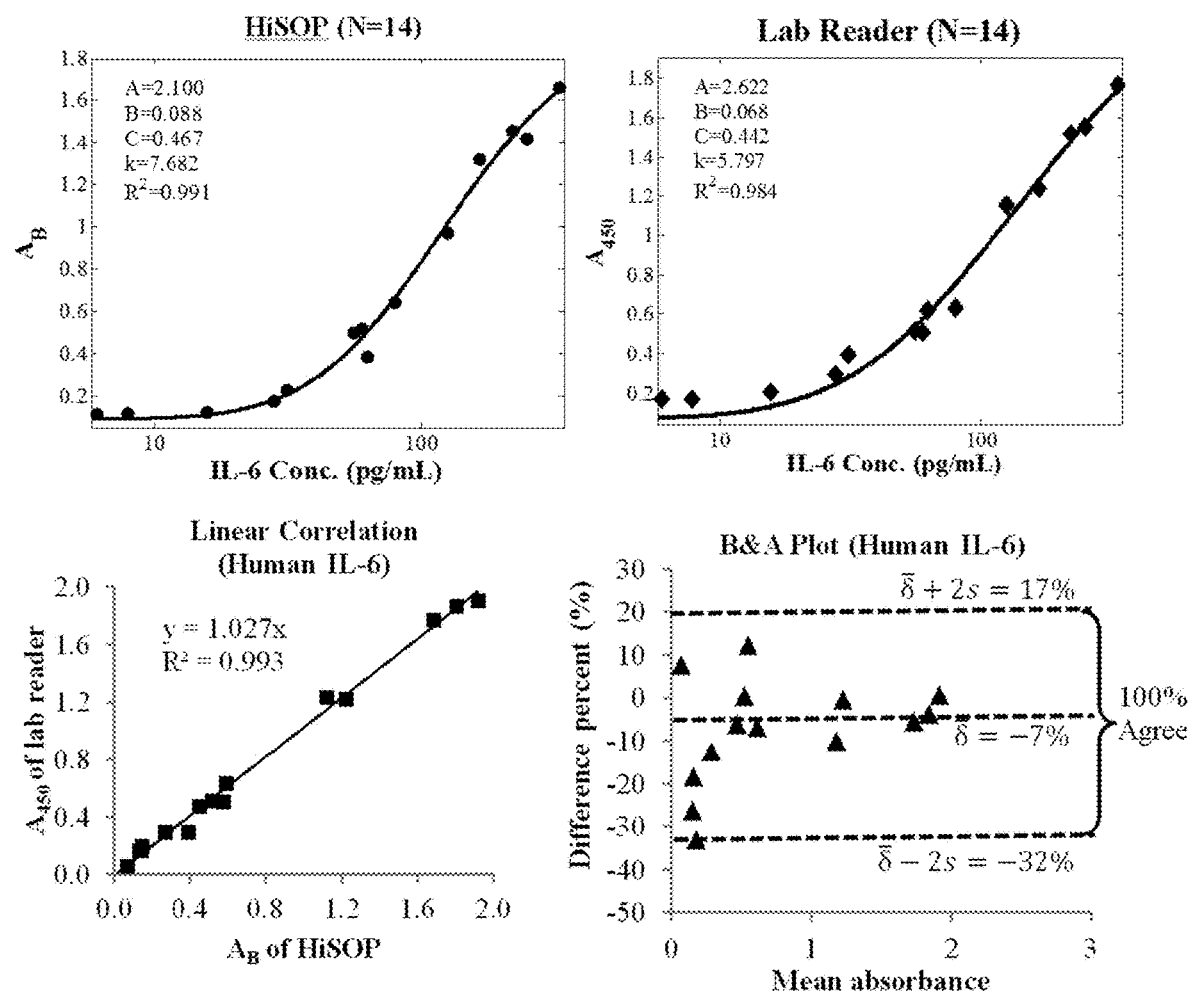
FIG. 10 shows plots of human IL-6 immuoassay calibration curve fitted by 4-PL curve read by the HiSOP in blue channel (AB) and the lab reader at wavelength 450 nm (A450), respectively. The linear regression and B&A plot are showing the strong correlation and reliability.

For quantification of immunoassays, human IL-6 concentrations were analyzed by the HiSOP in B channel (AB) and by the lab reader at 450 nm wavelength shown in FIG. 10. The readouts were fitted by a sigmoidal dose-response curve, also called a four-parameter logistic (4-PL) equation governed by the following Equation:

$$f(x) = A + \frac{B - A}{1 + (C \log_{10} x)^k}$$

where f(x) is the corresponding absorbance by either the HiSOP or the lab reader. x represents IL-6 concentration, with A and B being the maximum and minimum asymptote, respectively. C is the inflection point, and k is the Hill slope to describe the steepness of the fitting curves.

The goodness-of-fit achieved 99.1% by the HiSOP and 98.4% by the lab reader. The readouts of both instruments showed strong correlation up to 99.3%. In a B&A plot, all data points (100%) are within the limits of agreement. All analysis results in FIG. 10 can be evaluated as a very good agreement in immunoassays. We have validated our HiSOP reader as a reliable instrument compared with a traditional lab reader, showing quantitative ability and strong agreements in immunoassays.

Assessment of the HiSOP by Field Immunoassays of Plant Viruses

Figure 12:
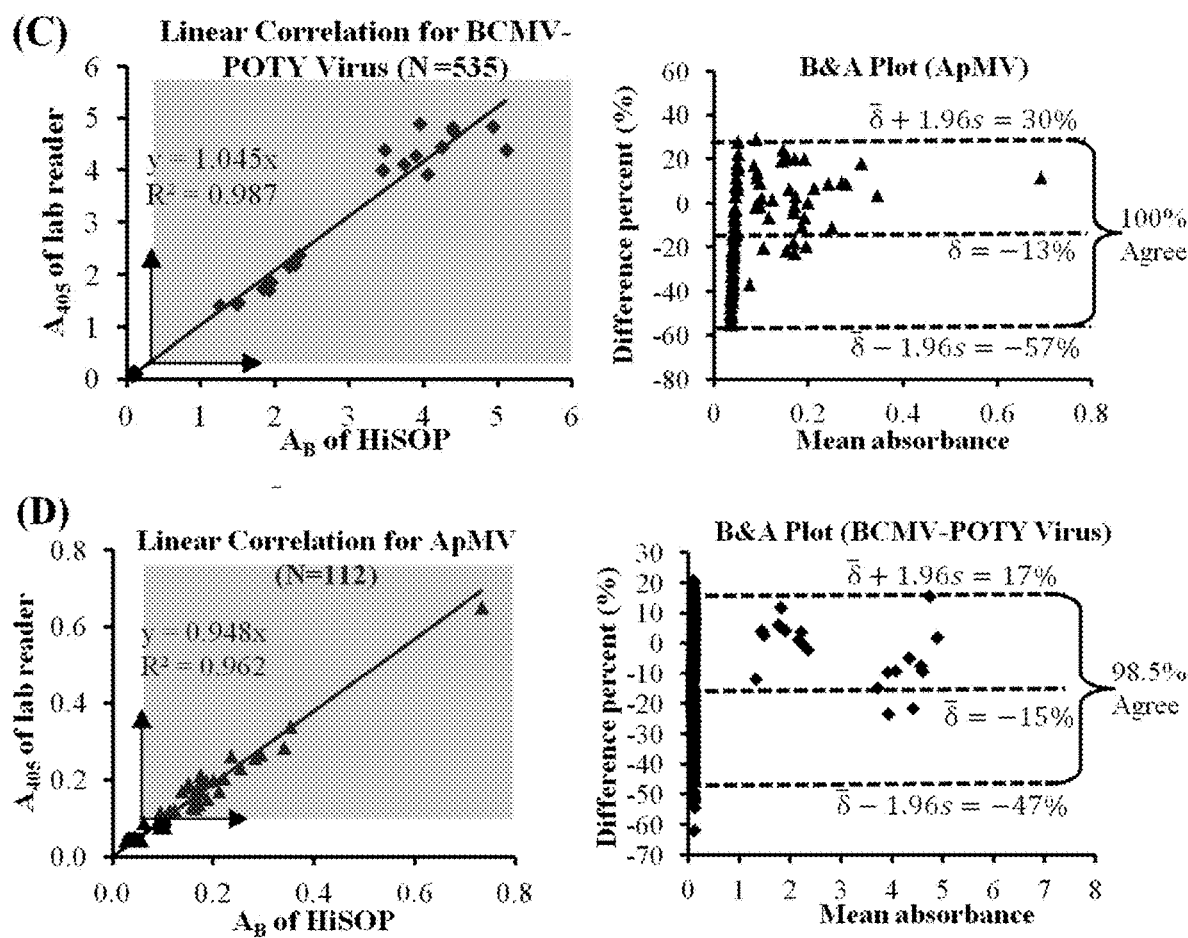
FIG. 12 shows linear correlation and B&A plots for (C) BCMV-POTY virus assayed by indirect ELISA with 535 samples and (D) ApMV assayed by DAS ELISA with 112 samples, and (E) PDV and (F) PNRSV assayed by DAS ELISA with 9 samples, respectively.
Figure 13:
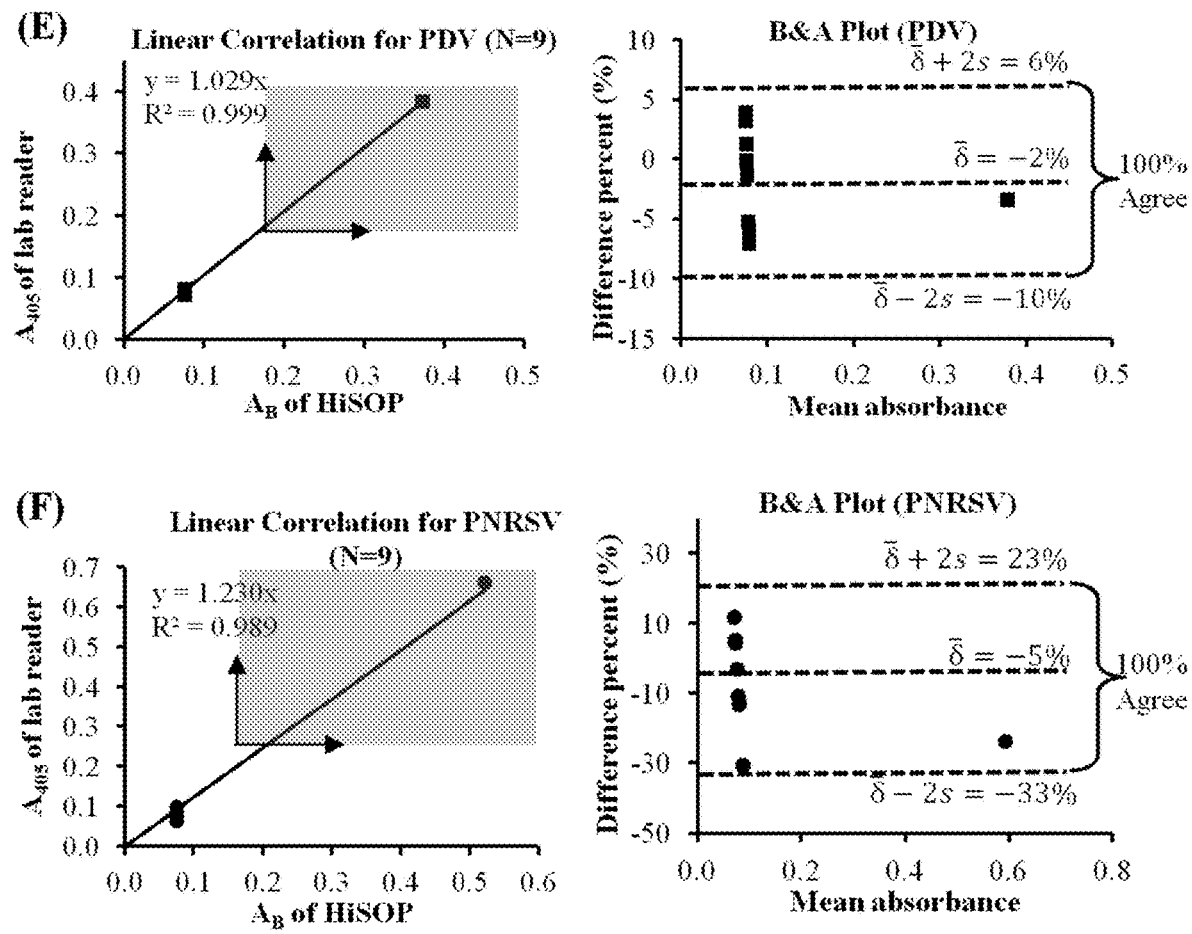
FIG. 13 shows linear correlation and B&A plots for (E) PDV and (F) PNRSV assayed by DAS ELISA with 9 samples, respectively.

To assess the feasibility and the reliability of the HiSOP in field testing, six types of plant viruses were tested by three ELISA methods, including direct, indirect, and DAS ELISA. The absorbance in B channel (AB) by the HiSOP and at 405 nm wavelength (A405) by the lab reader was measured. Linear correlation and difference plots are shown in FIGS. 11-13 to evaluate degrees of agreement with both instruments.

Figure 11:
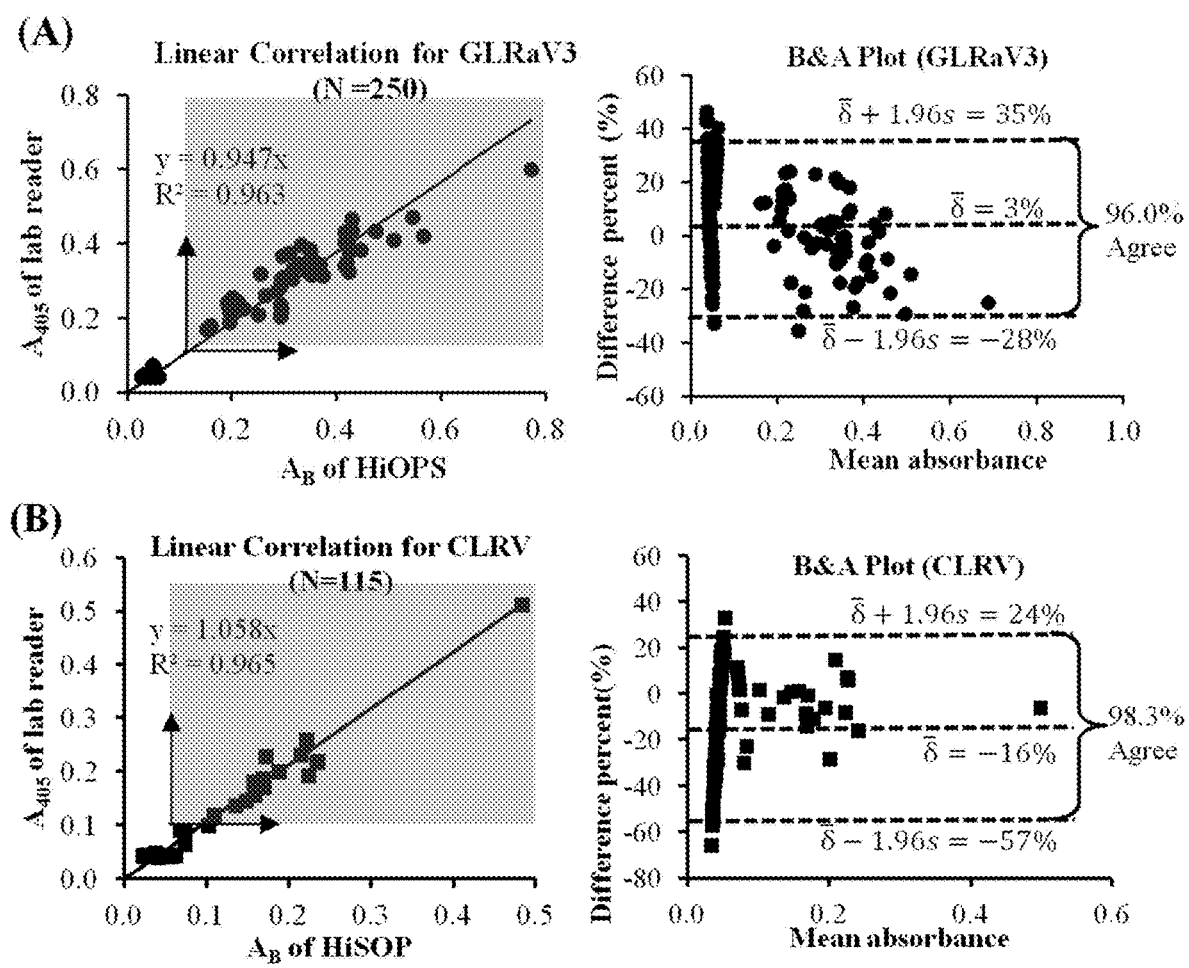
FIG. 11 shows linear correlation and B&A plots for (A) GLRaV3 assayed by direct ELISA with 250 samples and (B) CLRV assayed by direct ELISA with 115 samples, respectively.

First, direct ELISA was applied to detect GLRaV3 with 250 samples and CLRV with 115 samples in rows (A) and (B) (FIG. 11). The linear correlations are achieved to 96.3% and 96.5% respectively. In B&A plots, 96.0% difference data points of GLRaV3 and 98.3% difference data points of CLRV are within limits of agreements. Second, indirect ELISA was utilized to assay BCMC-POTY virus with 535 samples. In row (C) (FIG. 12), the linear correlation is 98.7% and 98.5% difference data points are within the limit of agreements. Third, DAS ELISA was tested for ApMV with 112 samples, PDV with 9 samples, and PNRSV with 9 samples. In rows (D), (E), and (F) (FIGS. 12-13), the linear correlations are up to 96.2%, 99.9%, and 98.9%. In B&A plots, 100% difference data points of ApMV, PDV, and PNRSV, respectively, are within the limit of agreements. All individual absorbance values of each sample are read by the HiSOP. According to ISTA recommendations, positive samples were labeled in the yellow blocks in the figures. The positive results were consistent using both instruments. All analytical results of the three types of ELISA methods show that the HiSOP and the lab reader are highly correlated with a high degree of agreement.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. An optical diagnostic apparatus, comprising:
an optical backlight illumination panel;
a plurality of sample wells configured adjacent the optical backlight illumination panel so as to receive light from the optical backlight illumination panel, and wherein the plurality of sample wells is configured with a first field of view;
at least one hard aperture array configured to isolate a directed light therethrough the plurality of sample wells from the optical backlight panel fixed beneath the at least one aperture array and adjacent the plurality of sample wells;
at least one optical array configured to receive optical information from the plurality of sample wells, wherein the at least one optical array comprises an array of individual microprisms configured with equal apex angles at distal equidistances along a row, wherein the individual microprism apex angles decrease toward the center of the row culminating in at least one flat surface along a center portion of the row;
an optical grating to enable spectral interrogation of the directed light; and
a detector configured to capture the optical information of the directed light received from the optical grating with a second field of view as provided by the at least one optical array.

2. The diagnostic apparatus of claim 1, wherein the optical array comprises at least one microprism array selected from: an 8×8 and an 8×12 array.

3. The diagnostic apparatus of claim 1, wherein the optical array comprises a single-stripe-prism array, wherein the single-stripe-prism array is configured as a linear array of individual microprisms with equal apex angles at distal equidistances configured on a row, wherein the individual microprism apex angles decrease toward the center of the row culminating in at least one flat surface along a center portion of the row.

4. The diagnostic apparatus of claim 1, wherein the at least one optical array comprises a monolithic micro-prism/lens array.

5. The diagnostic apparatus of claim 1, wherein the at least one optical array comprises a lens array adjacently coupled to a micro-prism array, wherein the micro-prism array is configured as an array of individual microprisms with equal apex angles at distal equidistances along a row, wherein the individual microprism apex angles decrease toward the center of the row culminating in at least one flat surface along a center portion of the row.

6. The diagnostic apparatus of claim 1, wherein the diagnostic apparatus further comprises at least one of a smartphone, a laptop, an IPAD, and a personal digital assistant (PDA) that couples to an input/output connector of the diagnostic system so as to enable optical information received by the detector to be respectfully interrogated via a disposed processor or transmitted as data to a remote location for data processing.

7. The diagnostic apparatus of claim 6, wherein the detector comprises a camera configured with the smart phone.

8. The diagnostic apparatus of claim 6, wherein the diagnostic apparatus is further configured to send the data to the remote location over at least one of: a hardwired connection, a cellular protocol, an IEEE protocol, and a Bluetooth protocol.

* * * * *